June 6, 1961 N. E. HUSTON ET AL 2,987,455
METHOD AND APPARATUS FOR REACTOR SAFETY CONTROL
Filed Aug. 7, 1956 4 Sheets-Sheet 1

INVENTORS
NORMAN E. HUSTON
RODNEY G. HOFF
BY CLIFFORD W. WHEELOCK

ATTORNEY

INVENTORS
NORMAN E. HUSTON
RODNEY G. HOFF
CLIFFORD W. WHEELOCK
BY William R. Lane
ATTORNEY June 6, 1961  N. E. HUSTON ET AL  2,987,455
METHOD AND APPARATUS FOR REACTOR SAFETY CONTROL
Filed Aug. 7, 1956  4 Sheets-Sheet 3

INVENTORS
NORMAN E. HUSTON
RODNEY G. HOFF
BY CLIFFORD W. WHEELOCK

ATTORNEY

June 6, 1961 N. E. HUSTON ET AL 2,987,455
METHOD AND APPARATUS FOR REACTOR SAFETY CONTROL
Filed Aug. 7, 1956 4 Sheets-Sheet 4

INVENTORS
NORMAN E. HUSTON
RODNEY G. HOFF
CLIFFORD W. WHEELOCK
BY
William Rhum
ATTORNEY United States Patent Office 2,987,455
Patented June 6, 1961

2,987,455
METHOD AND APPARATUS FOR REACTOR SAFETY CONTROL
Norman E. Huston, Woodland Hills, and Rodney G. Hoff and Clifford W. Wheelock, Canoga Park, Calif., assignors, by mesne assignments, to the United States of America as represented by the United States Atomic Energy Commission
Filed Aug. 7, 1956, Ser. No. 602,641
15 Claims. (Cl. 204—154.2)

This invention concerns a reactor safety control apparatus and method for controlling and automatically shutting down a nuclear reactor in the event of a runaway. More particularly, the invention is directed to a means and method of rapidly dispersing a neutron absorbing material or reactor poison into the core area of a nuclear reactor in response to a predetermined increase in reactor neutron flux.

For information concerning the theory, construction and operation of nuclear reactors, reference is made to Glasstone, "Principles of Nuclear Reactor Engineering" (D. Van Nostrand); "The Reactor Handbook" (3 volumes), available for sale from the Technical Information Service, Oak Ridge, Tennessee; U.S. Patents 2,708,656 and 2,714,577 to Fermi et al. and to "The Proceedings of the International Conference on Peaceful Uses of Atomic Energy," August 8–20, 1955, Geneva, Switzerland, available for sale at the United Nations' Book Store, New York, New York.

Heretofore, control of the maximum obtainable reactivity has been accomplished by the use of neutron absorbing materials stored outside the reactor. These materials have taken the form of rods, fluids, or balls, which either must be introduced in the reactor before a controlling effect can be realized or repositioned so that more of the rod, for example, is within the reactor. Since the power level of an uncontrolled reactor can increase at an extremely high rate, the neutron absorbing material should be introduced into the reactor extremely rapidly. If the neutron absorbing material is held outside the reactor, both the quantity of material which must be introduced and the distance it must be moved to effect the desired control are so great that, with a reasonable driving energy to introduce the neutron absorbing elements, the time required may in certain reactors be fairly long. During this time, the reactor could be permanently damaged or even have reached the state in which materials being expelled from the reactor would prevent the entrance of the control material. Furthermore, the prior art devices for effecting safety control are generally complex, are dependent on electrical energy and are not of the reliability necessary to provide a sure, fast way of emergency reactor control.

An object of this invention is to provide a means for a nuclear reactor safety control.

A further object of this invention is to provide a method of controlling a sudden increase of flux in a nuclear reactor.

A still further object of this invention is to provide a method and apparatus responsive to the fission of a fissionable material to rapidly shut down a reactor.

An additional object of this invention is to provide a self-contained reactor safety control means which is adapted to be inserted in a nuclear reactor core and be available for automatically shutting down a reactor in the event of a runaway.

A further object of this invention is to provide a reactor safety control and method for rapidly coating the coolant tubes of a nuclear reactor with a neutron absorbing substance.

A still further object of this invention is to provide a means and method of rapidly increasing the surface area of exposure of a neutron absorbing material in a nuclear reactor.

An additional object of this invention is to provide a reactor safety control and method having an extremely quick response to an increased flux level in a nuclear reactor.

A further object of this invention is to provide a means of rapidly volatilizing a reactor poison in a nuclear reactor in response to a predetermined increase in neutron flux in that reactor.

A still further object of this invention is to provide for the rapid injection of a reactor poison to coat the internal passages of the reactor when the flux level of the reactor has risen to a predetermined point.

An additional object of this invention is to provide an internally stored poison within a nuclear reactor adapted to poison the nuclear reaction in the high flux region of the nuclear reactor.

Other objects of invention will become apparent from the following description taken in connection with the accompanying drawings, in which.

The method and various means described herein greatly reduces the energy requirement and decreases the time interval necessary to accomplish control of the reactor. The various species of the device claimed herein provide a simple, reliable, self-contained, sabotage, bomb and earthquake-proof device for automatically shutting down a nuclear reactor in the event of a runaway. The reactor safety control means herein-mentioned basically comprises a source of neutron absorbing material or poison adapted to be placed in an untriggered state in the reactor, means to instantly increase the exposure of the material to an increased reactor neutron flux, or to otherwise quickly disperse the neutron absorbing material, and means responsive to a predetermined level of reactor neutron flux to trigger the exposure increasing or dispersing means. The neutron absorbing material is placed in proximity to or within the reactor core, and fissionable and thermally responsive means is used to trigger an increase in neutron absorbing material surface area exposed to the neutron flux. As hereinafter described in detail, the increase in exposure of the neutron absorbing material to the increasing neutron flux may be acomplished by volatilizing a compact volume of a reactor poison (i.e., isotopes having high thermal neutron absorption cross sections), and condensing the poison on the walls of the chamber placed inside the reactor, by providing for a shifting of the neutron absorbing material from a position in the reactor core in which it is shielded from neutron flux to a position exposed to said flux, or by providing various mechanical means for increasing the surface area of a neutron poison substance.

Figure 1:
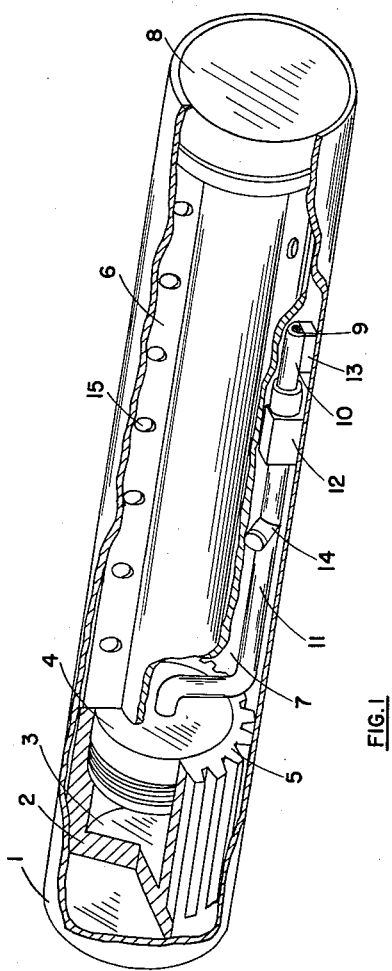
FIG. 1 is a fission-responsive safety element of a preferred construction.

Each of the safety devices of the present invention is normally constructed as a slug or can of the same standard dimensions as a regular fuel slug. The slugs may be charged into the fuel tubes of a heterogeneous nuclear reactor, such as the Oak Ridge National Laboratory graphite reactor or a Hanford-type reactor, with the fuel slugs. FIG. 1 shows a fuel element can 1 which is adapted to be placed in a reactor tube in proximity to the reactor core. A high pressure gas chamber 3, formed by the high pressure walls 2 and the closure cap 4, is provided within the casing 1. The chamber walls 2 are normally designed with heat conducting ribs or fins 5 to provide proper heat transfer within the devices. The gas chamber 3 is filled with a neutron absorbing material, generally in the form of a neutron poisoning gas under high pressure. Typically, this gas may be boron trifluoride ($BF_3$) enriched in $B^{10}$ isotope, helium ($He^3$), or any other radiation stable gas of high microscopic neutron capture cross-section. The can 1 contains a low pressure chamber 7 into which the neutron absorbing gas is released upon the happening of a predetermined positive change in reactivity in the nuclear reactor. A layer of cadmium may be plated on the inner surfaces of the chamber 3 to reduce neutron capture in the $BF_3$. A uranium powered heater 10, hereinafter described in detail, is provided within chamber 7. The uranium powered heater 10 is placed upon a thermal resistance pad normally made of stainless steel. This pad 13 removes normal operating heat from the uranium powered heater and provides the thermal load for the triggering assembly. Within the heater tube 10 is a solder plug 9 which seals the connecting tube 11 leading to the high pressure chamber 3 from the chamber 7. The tube 11 is supported on a terminal block 12 which is designed to remove heat from the tube 11, and is of such dimensions with respect to the heater tube 10 and the resistance pad 13 that no longitudinal heat flow takes place in the assembly. A silver-tin eutectic alloy may be conveniently used as the material for the solder plug. Specifically, a 96.5% tin–3.5% silver alloy has been found to be satisfactory. This alloy has a melting point of 221° C. so that triggering action is initiated when this temperature is reached. Other constructional features of the safety device include a fill port 14 for introducing high pressure gas into the chamber 3, and a web portion 6 to provide compressive support and sufficient weight and rigidity to prevent chattering of the element within a turbulent coolant stream flow through the reactor tubes. Web apertures 15 are provided to allow for flow of the poison gas throughout the low pressure space 7. End closure 8 completes the safety element construction. Typically, the can 1 may be made of stainless steel with an exterior cladding of aluminum or may be fabricated from zirconium sheet.

The heater tube, shown in FIG. 1 and hereinafter used in other modifications of the reactor safety device, normally contains uranium-235 in a proportion which is a function of the position of the heater within the reactor, of the reactor flux and of the thermal resistance of the pad 13 as in FIG. 1. For example, 25 percent by weight of enriched uranium oxide may be formulated with copper to provide a satisfactory heater. For example, the heater may be enriched with uranium-233, uranium-235, or plutonium-239. A typical heater may be made by compacting (at 16 tons per square inch) uranium-235 oxide powder (5 micron size) with copper powder (5 micron size) into a cylindrical button, sintering the button at 700–800° C. for one-half hour, preparing a five mil thick copper tube with a 0.0005 inch outer tin plate, cold coining the button onto the plated copper tube and heat treating for one hour at 600° C.

Operation of the device illustrated in FIG. 1 is as follows. During normal operation of a water-cooled reactor, the heat transfer from the heater 10 across the thermal resistance pad 13 and the terminal block 12 may be such that the solder plug will be maintained at a temperature of approximately 340° F. with normal water cooling and reactor power level, with a thermal neutron flux in the range of $10^{12}$ to $10^{13}$ n./cm.$^2$ sec. When a runaway starts, or an increase in the reactor flux occurs, more fission will take place in the heater tube, causing a temperature rise due to the increased heat flow through the thermal resistance pad 13. Loss of coolant in the reactor will also cause a rise in temperature of the heater and plug due to the decreased temperature differential across the thermal resistance pad and the casing. The solder plug 9, surrounded by the tubular uranium powered heater 10, may be designed so that it will blow out or melt when a 50 percent flux increase occurs. When the fuse plug 9 is removed, the poison gas from chamber 3 expands and fills the low pressure chamber 7 providing a neutron sink of high negative reactivity practically instantaneously with the nuclear incident. It is to be understood that generally various groupings of the disclosed safety devices would be made throughout various reactor regions and that such devices would be replaced with untriggered safety tubes upon the restart of a shut-down reactor.

Figure 2:
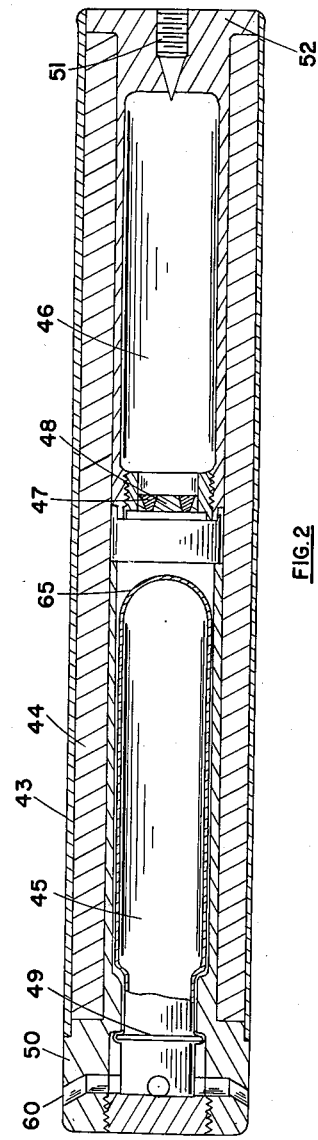
FIG. 2 shows a modification of the safety element which is adapted to inject a neutron poison into a reactor coolant tube.

FIG. 2 shows a modification of the basic reactor safety control means which includes a fissionable means to shield the neutron absorbing material from neutron flux during ordinary reactor operation, and means to transfer the neutron absorbing material to a non-shielded region. FIG. 2 illustrates an outer can 43 which may be charged directly into the reactor core. Within can 43 is a uranium shield 44, hereinafter described in detail, which shields the inner core of the safety member from neutron flux during normal operation. When the neutron absorbing material is surrounded by the layer 44 of uranium, enriched in uranium-235, no negative reactivity will be present; in fact, the neutrons absorbed in the uranium-235 will multiply and can be made to increase the reactivity in a positive direction. The energy for the transfer of the poison material from the shielded region is provided by a pressurized gas in chamber 46 which is released by the melting of a solder plug 47 caused by fission in a uranium powered heater 48. In FIG. 2 the uranium powered heated 48 takes the form of an apertured flat disc. Release of high pressure gas in the chamber 46 pressurizes the poison material which is contained in a flexible metal chamber 65, which in turn breaks the rupture disc 49 and expels the poison material into the coolant passages or other parts of the reactor through the exit ports 60. The poisoning effect on the reactor results from moving the neutron absorbing material from the shielded chamber within the tube 43 to an exposed position exteriorly thereof. The poison within the flexible chamber 65 may be a cadmium plating solution which will plate cadmium metal on the inner walls of the reactor cooling tubes and the surfaces of the fuel slugs. Other coatings containing gadolinium, boron or samarium may also be employed. The neutron poison used may take the form of compounds of such elements as boron, cadmium, gadolinium or samarium, such as the fluoborate ($BF_4$-radical), the octoate (salt of caprylic acid), or the naphtenate [e.g., $(C_{10}H_7-O)_2Cd$]. In addition, such compounds as cadmium sulfate or cadmium chloride can be used as the poisoning agent which is injected into the coolant tubes. In FIG. 2, the uranium-235 layer 44 has the function of replacing any neutrons that are absorbed by the poison during normal operation. The concentration of uranium-235 in the layer 44 may be varied to give any desired reactivity effect for controlling flattening in the reactor (i.e., extending operating flux level over a greater area), or for replacing normal fuel slugs with no changed reactivity effect. Upon discharge, the poison from the slugs is injected into the coolant passages surface over a considerable area and absorb many times as many neutrons as when contained within the shielding uranium shell. A fill port 51 and an internal support structure 52 are also provided in the design illustrated in FIG. 2.

Figure 3:
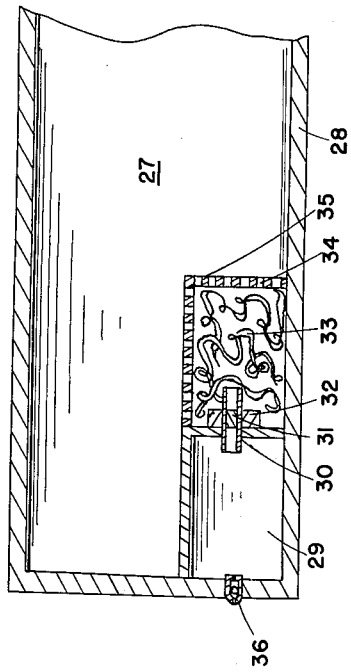
FIG. 3 shows a reactor safety control for volatilizing and condensing a neutron absorbing substance in a reactor.

FIG. 3 illustrates a further modification of a reactor safety control using the basic principles of this invention which entails the use of a chamber 29 containing a confined source of a pressurized, radiation stable, oxidizing agent, such as oxygen or a mixture of oxygen, water and hydrogen peroxide. Release of this oxidizing agent into a combustion chamber 33 containing a mass of poison-bearing, spontaneously combustible ribbons, such as a cadmium-sodium alloy or a cadmium-magnesium-barium alloy, provides a neutron poison vapor adapted to condense on surfaces within the reactor. In the FIG. 3 illustration, a disc-type uranium powered heater 32 is provided around a connecting tube 30 between the chambers 29 and 33 which, upon heating due to increased reactor flux, will melt or blow-out a solder plug 31, permitting access of the oxidizing agent to the poisoning mass. Vents 34 are provided around the chamber 33 to provide access of the poison vapors to the inner walls of the chamber 27. To prevent sublimation of the poison foils or mass prior to being fired in the reactor, a thin aluminum foil may be placed over the vents 34. As in the previous modifications, a fill port 36 is provided in the tube wall 28, providing for filling of the high pressure gas into the chamber 29. When the fission of the uranium disc 32 provides sufficient heat allowing the gas pressure to blow-out the solder plug 31, the oxidizing agent is released into the combustion chamber, inflaming the combustible material and volatilizing the poison material which then escapes through the vents and condenses as a film on the chamber walls in the chamber 27. This film need be only 0.014 centimeter thick to be 86 percent black to neutrons; hence, a comparatively small volume of cadmium provides poison for a large area. Combustible alloys having weight proportions, for example, of (1) 10 grams Cd and 4 grams Na; (2) 10 grams Cd and 10 grams U; (3) 10 grams Cd and 2 grams Mg; or (4) 10 grams Cd and 11 grams Ba, may be used as the poison mass. These mixtures are adjusted to have a sufficient quantity of combustible material to vaporize the cadmium.

Figure 4:
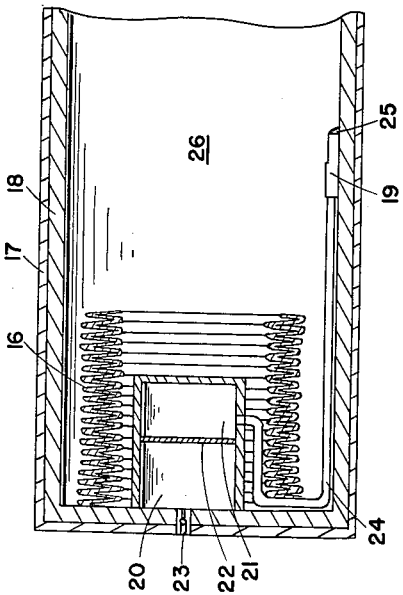
FIG. 4 shows a mechanical bellows arrangement for increasing the surface area exposure of a neutron absorbing material.

In the modification disclosed in FIG. 4, a uranium powered heater 19, adapted to heat a solder plug 25, is provided within an outer can 17 and an inner can 18. A high pressure chamber 20 and an intermediate pressure chamber 21, separated by a diaphragm 22, are provided with an outlet tube 24 leading from the intermediate pressure chamber to the chamber 26 in the can 18. Within the can 18 and in sealed relation with the chambers 20 and 21 is an expandable bellows 16 having a poison compound coated on the surface thereof. When the solder plug 25 is blown out due to a predetermined increase in fission rate in the heater 19 and the resultant weakening of the plug, the differential pressure on the opposite sides of the burst diaphragm 22 becomes such that the diaphragm 22 is broken, releasing the high pressure gas into chamber 21 and quickly breaking a burst diaphragm between chamber 21 and bellows 16. The released gas expands the bellows 16 into the chamber 26 so that the neutron absorbing surface area of the overall device is increased in response to the predetermined level of reactor neutron flux.

Figure 6:
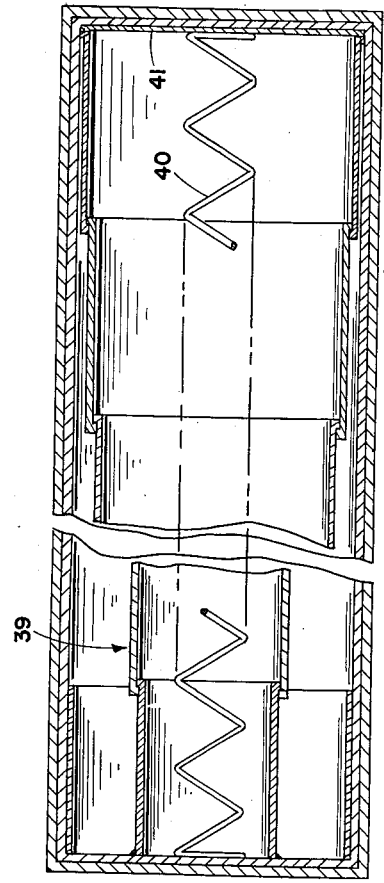
FIG. 6 shows the device of FIG. 5 in operating position.
Figure 5:
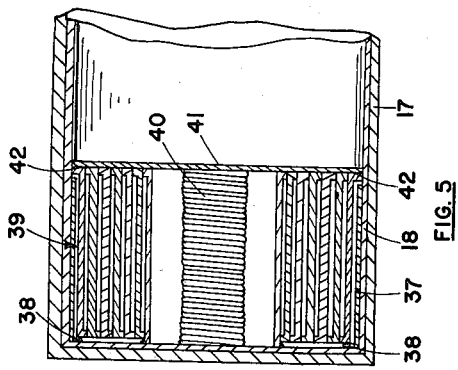
FIG. 5 shows a telescoping pipe of a reactor safety control device in the inoperative position.

In the FIG. 5 modification, a circular ring-type heater 37 is provided which is circumferentially placed on the inside periphery of the can 17, 18. Expandable telescoping elements 39 are concentrically placed in the heater ring 37, and a pressure means in the form of a coil spring 40 is placed coaxially with the outer and inner cans 17 and 18. Solder connections 38 and 42 are provided for keeping the sections 39 in telescoped position. FIG. 6 shows the telescope sections in expanded position. Such expansion takes place when the heater has a thermal response to an increase in neutron flux rate from the nuclear reactor, as heretofore explained. The increased heat from the fission in heater ring 37 begins to melt the connections 38 and 42 until a point is reached when the spring 40 has sufficient tension to expand the elements 39 into the position seen in FIG. 6. A plate 41, abutted by spring 40, is attached to the inner wall of the can layer 18 by solder 42 when in the inoperative position and is at all times attached to the outer of the telescoping sections.

Figure 7:
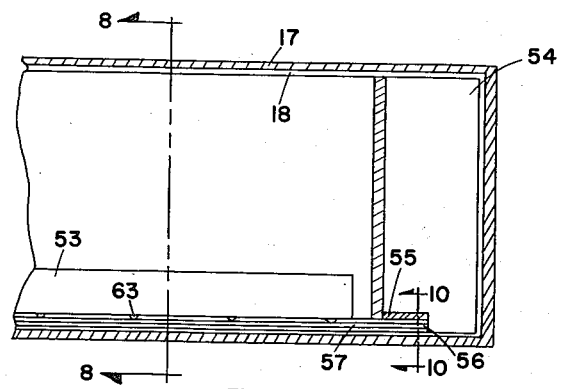
FIG. 7 shows a side view of a bladder-type safety element.

FIGS. 7–10 illustrate a further modification of the reactor safety device which comprises an expansible bladder coated with cadmium or other reactor poison which is adapted to be coiled in normal operation and fully expanded upon the occurrence of high flux incident in the nuclear reactor. In FIG. 7, within the can tube layers 17 and 18, is situated a coiled-up bladder 53 extending longitudinally in the fuel-slug type can. At one end of the can assembly is a high pressure chamber 54. Communicating with the high pressure chamber 54 and the interior of the bladder 53 is a tube 57, plugged with a solder plug 56, preventing access of the gas in the pressure chamber 54 to the inside of the bladder 53. A uranium powered heater 55 is provided around one-half the solder plug 56, which functions as the uranium powered heater heretofore described with respect to FIGS. 1–6. Increased flux rate in the nuclear reactor increases the fissioning of the uranium-235 in the heater 55 creating sufficient heat to allow the solder plug 56 to blow-out toward the interior of the bladder and to afford access of the pressurized gas in the chamber 54 to the inside of the bladder 53 through apertures 63. This trigger assembly can be designed to trigger with a nominal 25 to 50 percent increase in flux rate above a normal operating level in the range of $10^{12}$ to $10^{13}$ n./cm.$^2$ sec. or greater.

Figure 8:
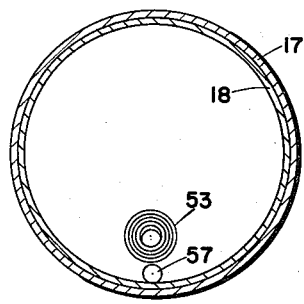
FIG. 8 is a cross-sectional view taken on the lines 8—8 of FIG. 7.

FIG. 8 shows the bladder 53 in coiled-up form, as well as a cross-section of the pressure in the connecting tube 57.

Figure 9:
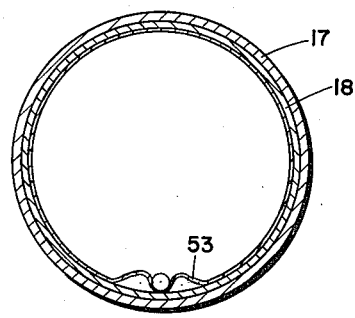
FIG. 9 is a cross-sectional view showing the bladder in operating position.

FIG. 9 shows the bladder 53 in expanded position, increasing the neutron absorbing surface area within the overall tube. Expansion is caused by the release of the pressurized gas in chamber 54 into the interior of bladder 53.

Figure 10:
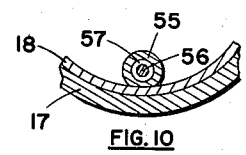
FIG. 10 is a cross-sectional view of the heater and solder plug taken on the lines 10—10 of FIG. 7.

FIG. 10 illustrates a partial cross-sectional cutaway showing the inner tube 57, the heater 55 and the solder plug 56, the latter providing the sealed means between the bladder and the pressurizing means responsive thermally to the increased fission in heater 55.

Figure 11:
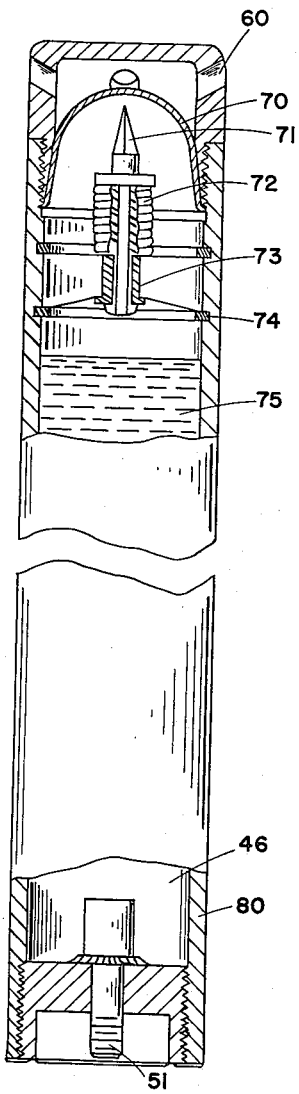
FIG. 11 is a further modification of a triggering device.

FIG. 11 shows a further modification of a stabilized triggering device for a reactor safety element. In this figure, a rupturable cap 70 is provided at one end of the safety element in juxtaposition with an opening 60 which allows injection of the poison material into the reactor core. The triggering mechanism comprises a needle 71 held in place against a compressed coil spring 72 by a solder button 74 pressing against a uranium-235 bearing collar 73. When the fission heat in the uranium-235 brings the solder to its yield point, the spring drives the needle through the diaphragm so that a poison in space 75 is expelled by a gas pressure in space 46 or by the expansion of the poison itself. The safety element has an external casing 80 therearound and a fill port 51 therein, as in the previous modifications.

Figure 13:
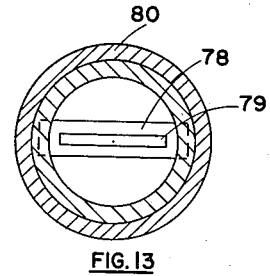
FIG. 13 is a cross-sectional view taken on the lines 13—13 of FIG. 12.
Figure 12:
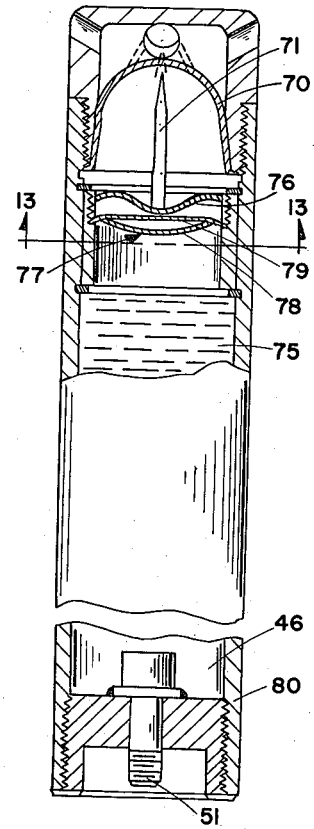
FIG. 12 is a still further modification of a triggering device.

FIG. 12 shows a trigger mechanism utilizing a metallic differential-expansion element. The safety element device shown therein has a similar casing 80 and fill port 51 as well as frangible cap 70 and needle 71. The needle 71 is attached to a power spring 76 which is adapted to be cocked in an unstable, triple curvature position, as shown, and is held in such position by a force exerted by a bimetallic element 77. This bimetallic element 77 comprises three parallel strips of spring steel with uranium-235 electroplated to the two outer strips 78, as shown in FIG. 13, so that they are heated in proportion of the neutron flux. The center strip 79 is elongated and formed into a curve having its convex side toward the rupturable cap 70 when relaxed. This element 79 is cocked by pressing the strip into the opposite curvature. Being slightly longer, the center strip 79 remains in this position until relative thermal expansion of the outer strip lessens the restraining compressive forces. The center spring then snaps to its original curvature and triggers the power spring 76, thus rupturing the diaphragm cap 70 and releasing the poison from its storage position 75.

Although the invention has been described and illustrated in detail, it is to be clearly understood that the same is by way of illustration and example only and is not to be taken by way of limitation, the spirit and scope of this invention being limited only by the terms of the appended claims.

Having thus described our invention, we claim:

1. In a method for controlling a nuclear reactor in the event of an excess reactivity excursion, the steps comprising disposing a compact quantity of a neutron absorber in a low neutron absorption configuration in the neutron flux of the core region of said reactor, providing means for dispersing said absorber into an expanded configuration of high neutron absorption characteristic said means being in proximity close to said absorber, restraining said dispersing means by means of a fusible trigger link, and melting said link by heat provided in a fissionable material heating element by the rise of the neutron flux above a predetermined safe level and cooling said heating element by coupling across a heat transfer resistance which in turn transfers the heat to the reactor coolant to actuate said dispersing means thereby disposing the neutron absorber into an expanded configuration of high neutron absorption characteristic.

2. In a method for controlling a nuclear reactor in the event of an excess reactivity excursion, the steps comprising disposing a compact quantity of a neutron absorber in a low neutron absorption configuration in the neutron flux of the core region of said reactor, shielding said neutron absorber from the reactor neutron flux, providing means for dispersing said absorber into an expanded configuration of high neutron absorption characteristic said means being close in proximity to said absorber, restraining said dispersing means by means of a fusible trigger link, and melting said link by heat provided in a fissionable material heating element by the rise of a neutron flux above a predetermined safe level and cooling said heating element across a heat transfer resistance which is turn transfers the heat to the reactors coolant to actuate said dispersing means thereby dispersing the neutron absorber into an expanded configuration of high neutron absorption characteristic outside of the shielded configuration.

3. The method as defined in claim 1 wherein said means for dispersing said absorber comprises injection means and the expanded configuration of the absorber comprises a coating on interior surfaces of the reactor.

4. The method as defined in claim 1 wherein said neutron absorber comprises a spontaneously combustible absorber, said dispersing means comprises an oxidizer and said expanded configuration of absorber comprises vaporized absorber produced by combustion of said combustible neutron absorber.

5. A self-contained nuclear reactor safety control unit comprising a closed tubular housing adapted for disposition within a cavity or passageway in the core region in the neutron flux of a nuclear reactor, a neutron absorbing material disposed within said housing in a first compact configuration having a low neutron absorption characteristic in the reactor neutron flux, energized expansion means for dispersing said material into a second expanded configuration having an increased neutron absorption characteristic in said neutron flux, and means within said housing actuating said dispersing means upon an increase in neutron flux to a predetermined level, said actuating means including a trigger arrangement comprising a fusible solder link coupled to trigger said dispersion means, said fusible solder link being thermally coupled to a heating element powered by a fissionable material fissioning in said neutron flux and being arranged for cooling across a heat transfer resistance terminating in contact with said housing, whereby either an increase in said neutron flux or a decrease in cooling causes an increase in the temperature of said fusible link.

6. A self-contained nuclear reactor safety control unit comprising a tubular housing adapted for disposition within the neutron flux region of a nuclear reactor core, a neutron absorbing material disposed compactly in a portion of said housing, means shielding said portion of the housing to provide a low neutron absorption characteristic for said neutron absorbing maetrial, means for transferring said material to a non-shielded region in said reactor core and dispersing said material thereby providing an increased neutron absorbing characteristic, and means within said housing actuating said dispersing means upon an increase in said neutron flux to a predetermined level, said actuating means including a trigger arrangement comprising a fusible solder link coupled to trigger said transferring means, said fusible solder link being thermally coupled to a heating element powered by a fissionable material fissioning in said neutron flux and being arranged for cooling across a heat transfer resistance terminating in contact with said housing, whereby either an increase in said neutron flux or a decrease in cooling causes an increase in the temperature of said fusible link.

7. A self-contained nuclear reactor safety control unit comprising a tubular housing adapted for disposition within a cavity or passageway in the neutron flux in the core region of a nuclear reactor, a neutron absorbing material disposed within said housing in a first compact configuration having a low neutron absorption characteristic in the reactor neutron flux, pressurizing dispersing means arranged to disperse said neutron absorbing material in an expanded configuration having an increased neutron absorption characteristic, and means within said housing actuating said dispersing means upon an increase in said neutron flux to a predetermined level, said actuating means including a trigger arrangement comprising a fusible solder link restraining said pressurizing dispersing means from dispersing said neutron absorbing material, said fusible link being thermally coupled to a heating element powered by a fissionable material fissioning in said neutron flux and being arranged for cooling across a heat transfer resistance terminating in contact with said housing, whereby either an increase in said neutron flux or a decrease in cooling causes an increase in the temperature of said fusible link.

8. A self-contained nuclear reactor safety control unit comprising a tubular housing adapted for disposition within the neutron flux region of a nuclear reactor core, a neutron absorbing material disposed compactly in a portion of said housing, means shielding said portion of the housing to provide a low neutron absorption characteristic for said neutron absorbing material, pressurizing dispersing means arranged to expel said neutron absorbing material from said portion of the housing into an expanded configuration having an increased neutron absorbing characteristic, and means within said housing actuating said dispersing means upon an increase in said neutron flux to a predetermined level, said actuating means including a trigger arrangement comprising a fusible solder plug restraining said pressurizing dispersing means, said fusible solder plug being thermally coupled to a heating element powered by a fissionable material fissioning in said neutron flux and being arranged for cooling across a heat transfer resistance terminating in contact with said housing, whereby either an increase in said neutron flux or a decrease in cooling causes an increase in the temperature of said fusible link.

9. A self-contained nuclear reactor safety control unit comprising a closed tubular housing adapted for disposition within a cavity or passageway in the neutron flux of the core region of a nuclear reactor, a pressurized oxidizer confined in a portion of said housing, a spontaneously combustible neutron absorbing material disposed in a compact configuration having a low neutron absorption characteristic in another region of said housing, and intermixing means within said housing for bringing said oxidizer and spontaneously combustible material into contact whereupon combustion occurs and vapors of said material are produced and dispersed coating the interior surfaces of said housing providing an expanded configuration having an increased neutron absorption characteristic, said intermixing means including a passageway communicating said oxidizer and combustible material, and means within said housing actuating said intermixing means upon an increase in neutron flux to a predetermined level, said actuating means including a trigger arrangement comprising a fusible solder link disposed as a plug closing said passageway of said intermixing means, said fusible solder link plug being thermally coupled to a heating element powered by a fissionable material fissioning in said neutron flux and being arranged for cooling across a heat transfer resistance terminating in contact with said housing, whereby an increase in said neutron flux or a decrease in said cooling across said resistance causes an increase in the temperature of said link plug.

10. A self-contained nuclear reactor safety control unit comprising a cylindrical housing adapted for disposition in a cavity or passageway in the neutron flux region of a nuclear reactor core, an oxidizer confined in a portion of said housing, a combustion chamber having an orifice communicating with said housing portion confining the oxidizer, spontaneously combustible neutron absorbing material disposed in a compact low neutron absorption configuration in said chamber, and trigger means within said housing actuating contact of said oxidizer with the spontaneously combustible neutron absorbing material upon an increase in neutron flux to a predetermined level, said actuating means including a fusible link plug closing said orifice, said fusible solder link plug being thermally coupled to a heating element powered by a fissionable material fissioning in said neutron flux and being arranged for cooling across a heat transfer resistance coupled to said plug and terminating in said housing whereby an increase in said neutron flux or a decrease in cooling across said resistance causes an increase in the temperature of said plug and whereby said plug is melted upon the happening of an excessisve neutron flux releasing said oxidizer into combustible contact with said material to produce dispersed vapors having an expanded configuration of high neutron absorption characteristic.

11. A self-contained nuclear reactor safety control unit comprising a closed cylindrical housing adapted for disposition in a cavity or passageway in the neutron flux region of a nuclear reactor core provided internally with high and low pressure chambers interconnected by a communicating passage neutron absorber gas disposed in a pressurized compact configuration having a low neutron absorption characteristic in said high pressure chamber, and trigger means within said housing actuating communication between said chambers upon an increase in neutron flux to a predetermined level, said actuating means including a fusible solder link plug closing the passage communicating the high with the low pressure chambers of said housing, said fusible solder link plug being thermally coupled to a heating element powered by a fissionable material fissioning in said neutron flux and being arranged for cooling across a heat transfer resistance coupled to said plug and terminating in said housing, whereby an increase in neutron flux or a decrease in cooling across said resistance causes an increase in the temperature of said plug whereby said fusible plug melts to release and disperse said gas into the low pressure chamber providing an expanded configuration of the neutron absorber having an increased neutron absorption characteristic.

12. A self-contained nuclear reactor safety control unit comprising a cylindrical housing adapted for disposition in a cavity or passageway in the neutron flux region of a nuclear reactor core, an expansible element in said chamber provided with a coating of a neutron absorber and disposed in a collapsed compact configuration having a low neutron absorption characteristic, means for expanding the expansible element disposed within said housing, and means for actuating the expanding means upon an increase in neutron flux to a predetermined level, said actuating means including a fusible trigger link restraining said expanding means and being thermally coupled to a heating element powered by a fissionable material fissioning in said neutron flux and being arranged for cooling across a heat transfer resistance coupled to said plug and terminating in said housing whereby an excesssive increase in the neutron flux or a decrease in cooling across said resistance causes an increase in the temperature of said plug and whereby said trigger link melts to actuate the expanding means expanding the expansible member and providing an expanded configuration of the neutron absorber having an increased neutron absorbing characteristic.

13. Apparatus as defined in claim 12 wherein said expansible member comprises a bladder and said expanding means comprises a pressurizing arrangement.

14. Apparatus as defined in claim 12 wherein said expansible member comprises a telescoping cylinder and said expanding means comprises a pressurizing arrangement.

15. Apparatus as defined in claim 12 wherein said expansible member comprises a bellows and said expanding means comprises a pressurizing arrangement.

References Cited in the file of this patent

UNITED STATES PATENTS

| | | |
|---|---|---|
| 2,579,994 | Zinn | Dec. 25, 1951 |
| 2,735,811 | Weinberg et al. | Feb. 21, 1956 |

OTHER REFERENCES

KAPL–M–LBV–7, Reactor Safety Fuses by Vanderberg, USAEC report dated Sept. 23, 1955, declassified April 4, 1957, pages 3–12, 17–38. (Copy in 204–193.3.)

APEX–397, Internal Fuses for Low-Power Reactors by Donaven et al., USAEC report dated October 1953, published Aug. 15, 1958, pages 7–21. (Copy in Scientific Library.)

NAA–SR–1761, The Transient Behavior of a Prototype Reactor Fuse in Simulated Reactor Excursions by Huston and Eggleston, USAEC report issued Mar. 15, 1957, pages 6–33. (Copy in Scientific Library.)

APEX–245, Evaluation of a Spring-Operated Release Mechanism for a Compressed Gas-Boron Powder Nuclear Fuse by Spera, USAEC report, dated Dec. 7, 1954, declassified Nov. 9, 1959. (Copy in 204–193.3.)

Nucleonics, vol. 13 (August 1955), pages 30–33. (Copy in Scientific Library.)

Nucleonics, vol. 14 (No. 3, March 1956), page 37.

Proceedings of the International Conference on the Peaceful Uses of Atomic Energy, August 8–20, 1955, vol. 13, United Nations, New York, page 125.